Figure 1:
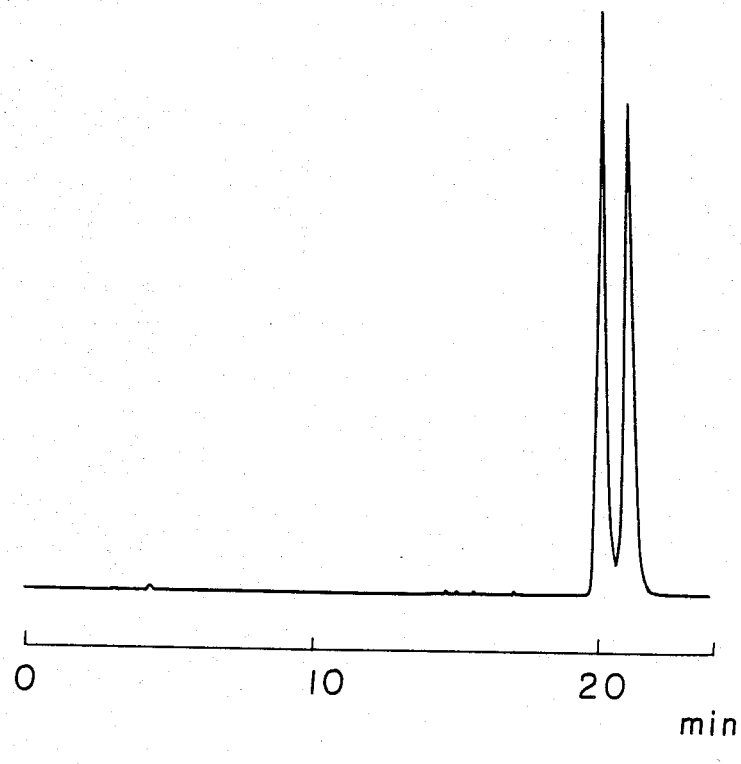

United States Patent [19]

Kitayama et al.

[11] Patent Number: 4,830,921
[45] Date of Patent: May 16, 1989

[54] PACKING MATERIAL FOR LIQUID CHROMATOGRAPHY

[75] Inventors: Ryuichi Kitayama, Shin-nanyo; Katsuo Komiya, Hikario; Yoshio Kato, Shin-nanyo, all of Japan

[73] Assignee: Tosoh Corporation, Shin-Nanyo, Japan

[21] Appl. No.: 128,168

[22] Filed: Dec. 3, 1987

[30] Foreign Application Priority Data

Dec. 3, 1986 [JP] Japan ................... 61-286813

[51] Int. Cl.$^4$ ................... B32B 9/00; B01D 15/08
[52] U.S. Cl. ................... 428/406; 210/198.2; 210/502.1; 210/635; 210/656; 502/401; 502/439; 428/403; 428/404
[58] Field of Search ............... 428/403, 404, 406, 407; 210/656, 502.1, 635, 659, 198.2; 261/DIG. 72; 435/180, 181; 502/401, 407, 439

[56] References Cited

U.S. PATENT DOCUMENTS 4,324,681  4/1982  House .
4,512,898  4/1985  Oi et al. ................... 210/502.1
4,604,207  8/1986  Oi et al. ................... 210/656

FOREIGN PATENT DOCUMENTS 0108813  of 0000  European Pat. Off. .
0155968  8/1985  Japan ................... 210/656

OTHER PUBLICATIONS

Journal of Chromatography, vol. 295, No. 2, Jul. 1984, pp. 367–376
Journal of Chromatography, vol. 361, 1986, pp. 93–105.

Primary Examiner—George F. Lesmes
Assistant Examiner—James B. Monroe
Attorney, Agent, or Firm—Cushman, Darby & Cushman

[57] ABSTRACT

A packing material for liquid chromatography, which comprises an optically active compound having the formula:

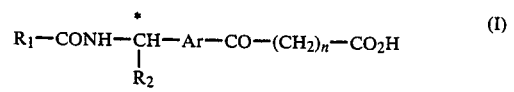

wherein Ar is a phenyl group, an α-naphthyl group or a β-naphthyl group, $R_1$ is an alkyl group having from 1 to 4 carbon atoms, a phenyl group or a 3,5-dinitrophenyl group, $R_2$ is an alkyl group having from 1 to 4 carbon atoms, *indicates an asymmetric carbon atom and n is an integer of 2 or 3, as a stationary phase.

7 Claims, 2 Drawing Sheets

PACKING MATERIAL FOR LIQUID CHROMATOGRAPHY

The present invention relates to a packaging material for liquid chromatography useful for resolution of isomers, particularly for optical resolution of racemic compounds.

Heretofore, stationary phases constructed with various optically active amides have been known. A packing material for liquid chromatography wherein an optically active substance is introduced by an amide bond to a substrate prepared by grafting a silane treating reagent having a $\gamma$-aminopropyl group to silica gel, is described in detail in e.g. J. Liq, Chromatogr., 9, 241 (1986) and J. Liq. Chromatogr., 9, 443 (1986). Optically active substances known to be used for a stationary phase include (L)-amino acids, optically active amines and optically active carboxylic acids. For example, (L)-valine, (L)-leucine, (L)-$\alpha$-phenylglycine derivatives, (S)-(−)-$\alpha$-(1-naphthyl)ethylamine derivatives or chrysanthemumic acid may be mentioned. The optically active stationary phase is prepared by the formation of an ionic bond or a covalent bond between an amino group in the $\gamma$-aminopropyl group grafted to the silica gel surface and a carboxyl group of the optically active derivative. Such a stationary phase distinguishes a racemic compound usually by the interaction by a hydrogen bond between the amide bond and an amide bond or ester bond of the racemic compound and or by the $\pi$-$\pi$ interaction and or by a delicate difference in the steric environment for separation, and as the eluent, it is usual to employ a hexane-dichloroethane system.

Conventional optically active stationary phases have not only various characteristics but also many problems. Namely, when a stationary phase is prepared by using an amino acid, the amino groups are protected by various acid anhydrides or acid halides and the remaining carboxyl groups are condensed with or ionically bonded to amino groups of the silica gel grafted with $\gamma$-aminopropyl groups to form a stationary phase. Here, the asymmetric center of the optically active substance is active methylene, and the stationary phase tends to undergo racemization under various environments such as acidic, basic or thermal environments.

When an optically active amine is used for a stationary phase, a further spacer is required in order to condense it with or ionically bond it to an amino group of the $\gamma$-aminopropyl group of the substrate. Namely, treatment of the optically active substance with a dicarboxylic acid is required for this purpose.

In the case of the optically active carboxylic acid, there is a difficulty that such a carboxylic acid is hardly available as a natural product.

Further, the separation or resolution of a racemic compound by high performance liquid chromatography has had a limitation such that on one type of packing material, the rage of the application to racemic compound samples has been restricted.

The present inventors have conducted extensive research to overcome the above-mentioned problems on the synthesis and to expand the range of the racemic samples to be resolved and as a result, have found that by using as the stationary phase an optically active compound shown by the formula I wherein the asymmetric center is not active methylene, it is possible to obtain a packing material for liquid chromatography which can readily be prepared and which is extremely effective for optical resolution of racemic compounds. The present invention has been accomplished on the basis of this discovery.

The present invention provides a packing material for liquid chromatography, which comprises an optically active compound having the formula:

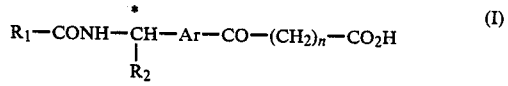

(I)

wherein Ar is a phenyl group, an $\alpha$-naphthyl group or a $\beta$-naphthyl group, $R_1$ is an alkyl group having from 1 to 4 carbon atoms, a phenyl group or a 3,5-dinitrophenyl group, $R_2$ is an alkyl group having from 1 to 4 carbon atoms, * indicates an asymmetric carbon atom and n is an integer of 2 or 3, as a stationary phase.

Now, the present invention will be described in detail with reference to the preferred embodiments.

Figure 2:
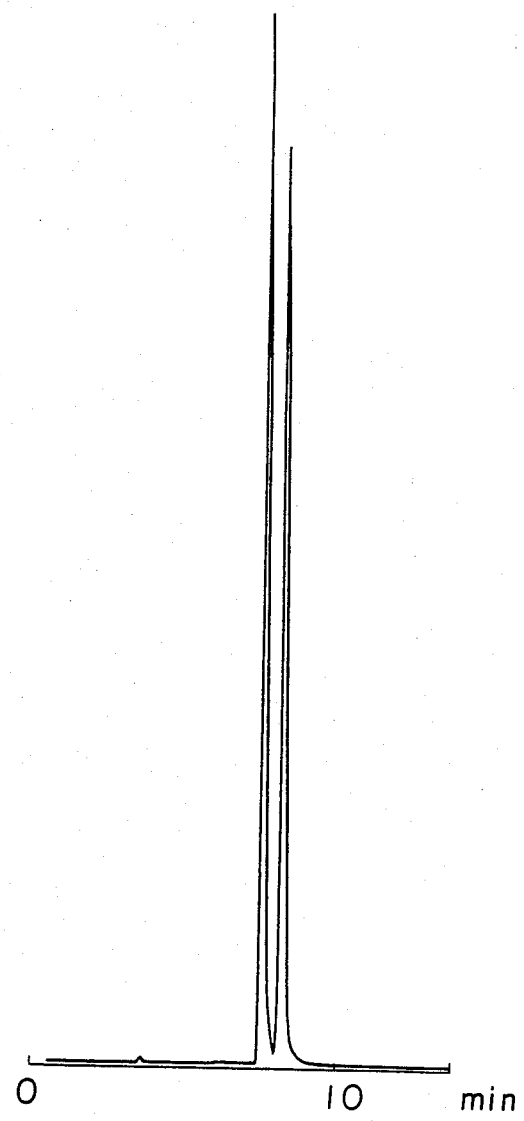

In the accompanying drawings, FIGS. 1 and 2 show chromatograms illustrating the separation of racemic samples by means of packing materials of the present invention.

The

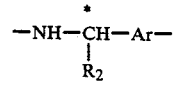

moiety constituting the asymmetric center of the formula I is derived from an optically active $\alpha$-aromatic amine wherein the asymmetric center is not active methylene. Such an amine may be an $\alpha$-phenylethylamine or an $\alpha$-(1- or 2-naphthyl)ethylamine, such as (S)-(−)- or (R)-(+)-$\alpha$-phenylethylamine, or (S)-(−)- or (R)-(+)-$\alpha$-(1-naphthyl)ethylamine.

The $R_1$—CO— moiety is derived from an acid halide such as acetyl chloride, benzyl chloride or 3,5-dinitrobenzyl chloride or from an acid anhydride such as acetic anhydride, and it forms an amide bond with the asymmetric center moiety.

The $HO_2C$—$(CH_2)_n$—CO— moiety is introduced for fixing to the substrate surface of the packing material, and it is derived from an acid anhydride such as succinic anhydride and has a carboxyl group.

In the formula I, $R_1$ is preferably a methyl group, a phenyl group or a 3,5-dinitrophenyl group, and $R_2$ are preferably a methyl group.

Now, a process for the preparation of the packing material of the present invention will be described.

The optically active compound of the formula I of the present invention may be prepared by a known method. For example, an optically active amide compound is firstly prepared by the reaction of an $\alpha$-aromatic amine with an acid chloride or with an acid anhydride, and then the amide compound is reacted with an acid anhydride in methylene chloride in the presence of aluminum chloride to introduce a carboxyl group to the amide compound, whereby an optically active compound of the formula I will be obtained.

When the optically active compound of the present invention is used as a stationary phase of a packing material, the substrate may be a porous carrier such as silica gel, glass beads or diatomaceous earth, which may be spherical or in the form of pulverized particles. Preferably, the carrier is spherical particles having a particle size of from 0.1 to 1,000 μm, more preferably from 1 to 100 μm and a pore size of from 10 to 1,000 Å, more preferably from 50 to 500 Å.

As a method for fixing the optically active compound to the substrate carrier, there may be mentioned a method of adsorbing it to the substrate carrier, a method of fixing it by an ionic bond and a method of fixing it by an amide bond. When the conditions for liquid chromatography are taken into consideration, it is preferred to fix it by the amide bond or the ionic bond. For the formation of the amide bond or the ionic bond, an amino group-containing organosilane such as γ-aminopropyltrimethoxysilane or γ-aminopropyltriethoxysilane is reacted with the substrate carrier in a solvent in accordance with a conventional method to introduce amino groups to the surface of the substrate carrier. The amount of the amino groups introduced is preferably up to 2.0 meq/g dry carrier. To the amino group-containing carrier thus obtained, the optically active compound of the present invention is reacted in the presence of a condensation reagent such as dicyclohexylcarbodiimide to fix the compound on the carrier by an amide bond. Otherwise, the compound may be fixed by an ionic bond without adding the condensation reagent. Both bonds may also be present.

When the separation factor and the number of theoretical plates as a packing material for liquid chromatography are taken into consideration, the amount of the optically active compound introduced is preferably from 0.1 to 1.0 meq/g dry carrier. If the amount of introduction is too small, the object of the present invention can not be accomplished. On the other hand, if the amount is excessive, the properties as the packing material tend to deteriorate for some reasons, whereby adequate separation factor or number of theoretical plates can hardly be obtained.

So long as the amount of the optically active compound introduced is within the above-mentioned range, an ionic bond is also formed by a usual amidation reaction for fixation, and it is effective for the improvement of the number of theoretical plates to remove the portion fixed by the ionic bond by treating with an acidic aqueous solution/containing methanol or the like.

Further, amino groups remaining on the surface of the carrier to which the optically active compound has been fixed, are likely to adversely affect the separation due to e.g. adsorption depending upon the type of the racemic sample, particularly in the case of an acidic racemic sample. In such a case, the remaining amino groups may be modified and protected, for example, by acetylation. In the packing material thus obtained, the fixation is made by a covalent bond, and various eluents ranging from an aqueous system to an organic solvent system such as hexane may suitably be selected, whereby the range of the racemic samples to be separated will accordingly be widened.

The packing method of the packing material of the present invention into a column can be conducted by a known usual method.

Now, the present invention will be described in further detail with reference to Examples. However, it should be understood that the present invention is by no means restricted to such specific Examples.

EXAMPLE 1

Preparation of γ-aminopropyl grafted silica gel 50 g of slica gel (particle size: 4 μm, pore size: 100 Å) was washed on a glass filter with about 200 ml of a 0.1N HCl aqueous solution. Then, it was washed with distilled water until the filtrate became neutral, then washed with methanol to remove water and dried under reduced pressure. 50 g of the dried gel was suspended in 500 ml of dried toluene, and 45 g of γ-aminopropyltriethoxysilane was added thereto. The mixture was stirred at 95° C. for 6 hours. After completion of the reaction, the reaction solvent was filtered off by a glass filter, and the treated silica gel was washed with methanol and dried under reduced pressure. The amount of the introduced amino group was measured by titration, whereby it was found to be 0.9 meq/g dry silica gel.

Elemental analysis: C: 3.4%, H: 1.1%, N: 1.3%.

Modification of (S)-(−)-α-(1-naphthyl)ethylamine 10 g of (S)-(−)-α-(1-naphthyl)ethylamine (manufactured by Hydras Kagaku) was dissolved in 500 ml of chloroform, and 24.4 mg of triethylamine was added to the solution. Then, 14.8 g of 3,5-dinitrobenzoyl chloride was added thereto under cooling with ice, and the mixture was reacted for about 5 hours at a temperature of from cooling with ice to room temperature. After completion of the reaction, the reaction mixture was diluted with 500 ml of chloroform, and the organic layer was washed sequentially with a dilute hydrochloric acid aqueous solution, a dilute sodium hydroxide aqueous solution and a saturated sodium chloride aqueous solution and then dired over anhydrous sodium sulfate. Then, chloroform was distilled off under reduced pressure to obtain 23.6 g of a crude product. The product was recrystallized from ethanol to obtain 18.14 g of N-3,5-dinitrobenzoyl-(S)-α-(1-naphthyl)ethylamine. This substance was a known substance, and its infrared spectrum (hereinafter referred to simply as IR) and molecular weight spectrum (hereinafter referred to simply as MS) agreed to the respective values disclosed in literatures.

| IR $\nu_{max}^{KCl}$: | 1640 cm$^{-1}$ | Amide bond |
|---|---|---|
| | 1600 cm$^{-1}$ | Aromatic ring |
| | 1560 cm$^{-1}$ | ⎫ Nitro group |
| | 1350 cm$^{-1}$ | ⎭ |
| MS: | 365 (M$^+$) | |

Friedel-Crafts reaction of N-3,5-dinitrobenzoyl-(S)-α-(1-naphthyl)ethylamine 5 g of N-3,5-dinitrobenzoyl-(S)-α-(1-naphthyl)-ethylamine was dissolved in 1.5 liters of dried methylene chloride, and 2.05 g of succinic anhydride was added and dissolved under cooling with ice. Then, 7.36 g of aluminum chloride was gradually added thereto, and the mixture was reacted for about 20 hours at a temperature of from cooling with ice to room temperature. After completion of the reaction, the reaction mixture was trapped with a 0.1N HCl aqueous solution, and the organic layer was washed with a 0.1N HCl aqueous solution and a saturated sodium chloride aqueous solution and dried over anhydrous sodium sulfate. Then, the solvent was distilled off under reduced pressure to obtain 5.0 g of an optically active amide-carboxylic acid. This compound has positional isomers with repect to the aromatic ring, but such positional isomers may not be separated or purified for use. By the high performance liquid chromatography, it was confirmed that no starting material was present in this mixture. By the IR analysis, absorptions attributable to a ketone and a carboxylic acid were observed, whereby the chemical sturcture was comfirmed.

| IR $\nu_{max}^{KCl}$ | 1720 cm$^{-1}$ | Carboxylic acid |
|---|---|---|
| | 1690 cm$^{-1}$ | Ketone |
| | 1640 cm$^{-1}$ | Amide |
| | 1600 cm$^{-1}$ | Aromatic ring |
| | 1560 cm$^{-1}$ } | Nitro group |
| | 1350 cm$^{-1}$ | |

Condensation of the optically active amide-carboxylic acid to the α-aminopropyl grafted silica gel 786 mg (0.5 equivalent relative to the amino group on the carrier) of the optically active amide-carboxylic acid (the condensation product of N-3,5-dinitrobenzoyl-(S)-α-(1-naphthyl)ethylamine with succinic anhydride) was dissoved in 40 ml of tetrahydrofuran (hereinafter referred to simply as THF), and 400 mg of dicyclohexylcarbodiimide (hereinafter referred simply as DCC) was added thereto. The mixture was stirred at room temperature for one hour and then 4 g of the γ-aminopropyl grafted silica gel was added thereto, and the mixture was stirred at 40° C. for 20 hours. After completion of the reaction, the solvent was filtered off by using a glass filter, and remaining silica gel was washed with about 200 ml of methanol to obtain a pakcing material having an optically active stationary phase. This silica gel was found by titration to contain 0.57 meq/g of the remaining amino group, and the amount of the optically active amide-carboxylic acid introduced was 0.33 meq/g.

Elemental analysis: C: 9.4%, H: 1.6%, N: 2.4%.

| IR $\nu_{max}^{KCl}$ | 1640 cm$^{-1}$ | Amide bond |
|---|---|---|
| | 1560 cm$^{-1}$ } | Nitro group |
| | 1350 cm$^{-1}$ | |

EXAMPLES 2 to 5

In the same manner as in Example 1, packing materials of the present invention were prepared with the amounts of the introduced optically active compound as identified in Table 1.

TABLE 1

| | DCC | Optically active compound | | Elemental analysis | | |
|---|---|---|---|---|---|---|
| Example | (Equivalent) | Equivalent | Amount introduced (meq/g) | C (%) | H (%) | N (%) |
| 1 | 0.5 | 0.5 | 0.33 | 9.4 | 1.6 | 2.4 |
| 2 | 0.8 | 0.8 | 0.53 | 10.5 | 1.6 | 2.5 |
| 3 | 1.0 | 1.0 | 0.73 | 10.8 | 1.7 | 2.5 |
| 4 | 1.2 | 1.2 | 0.73 | 13.6 | 1.7 | 2.9 |
| 5 | 0 | 1.2 | | 16.4 | 2.0 | 3.3 |

In Example 5, the elemental analytical values after wasing off the ionic bond portion with CH$_3$CN/H$_2$O (0.5% NaCl) were C 3.6%, H 1.1% and N 1.2%.

EXAMPLE 6

Modification of (S)-(−)-α-phenylethylamine 10 g of (S)-(−)-α-phenylethylamine (manufactured by Tokyo Kasei) was reacted with 17.25 ml of triethylamine and 20.95 g, of 3,5-dinitrobenzoyl chloride in the same manner as in Example 1 to obtain N-3,5-dinitrobenzoyl-(S)-α-phenylethylamine. This substance is also a known compound, and the IR and MS values agreed to the values disclosed in literatures.

| IR $\nu_{max}^{KCl}$ | 1645 cm$^{-1}$ | Amide bond |
|---|---|---|
| | 1600 cm$^{-1}$ | Aromatic ring |
| | 1560 cm$^{-1}$ } | Nitro group |
| | 1350 cm$^{-1}$ | |
| MS: | 315 (M$^+$) | |

Friedel-Crafts reaction of N-3,5-dinitrobenzoyl-(S)-α-phenylethylamine

In the same manner as in Example 1, 5.0 g of of an optically active amide-carboxylic acid was prepared by using 5 g of N-3,5-dinitrobenzoyl-(S)-α-phenylethylamine, 1.5 liters of dried methylene chloride, 1.75 g of succinic anhydride and 8.47 g of aluminum chloride. This compound also has positional isomers with respect to the aromatic ring, but the isomers are not required to be separated or purified for use. By the high speed liquid chromatography, it was confirmed that not starting material was present in this mixture, and the chemical structure was ascertained by the IR analysis whereby an absorption attributable to a ketone and an absorption attributable to a carboxylic acid were observed anew.

| IR $\nu_{max}^{KCl}$ | 1720 cm$^{-1}$ | Ar—carboxylic acid |
|---|---|---|
| | 1690 cm$^{-1}$ | Ketone |
| | 1670 cm$^{-1}$ | Amide |
| | 1600 cm$^{-1}$ | Aromatic ring |
| | 1560 cm$^{-1}$ } | Nitro group |
| | 1350 cm$^{-1}$ | |

Condensation of the optically active amide-carboxylic acid to the γ-aminopropyl grafted silica gel A packing material having an optically active stationary phase was prepared by conducting the same treatment as in Example 1.

Elemental anlysis: C: 9.8%, H: 1.4%, N: 3.0%.

EXAMPLE 7

Modification of (S)-(−)-α-(1-naphthyl)ethylamine 5 g of (S)-(−)-α-(1-naphthyl)ethylamine (manufactured by Hydras Kagaku) was dissolved in 20 ml of pyridine, and 5.07 mg of acetic anhydride was added thereto under cooling with ice. The mixture was stirred at 38° C. for 12 hours. The reaction solution was diluted with 500 ml of chloroform, and the organic layer was sequentially washed with a dilute hydrochloric acid aqueous solution, a dilute sodium hydroxide aqueous solution and a saturated sodium chloride aqueous solution and dried over anhydrous sodium sulfate. The solvent was distilled off under reduced pressure. The reaction mixture thus obtained was recrystallized from dried ethanol to obtain 6.3 g of N-acetyl-(S)-α-(1-naphthyl)ethylamine. This substance is a known compound, and the measured values of various physical properties agreed to the values disclosed in literatures.

| IR $\nu_{max}^{KCl}$ | 1640 cm$^{-1}$ | Amide bond |
|---|---|---|

-continued

| | | |
|---|---|---|
| | 1600 cm$^{-1}$ | Aromatic ring |
| MS: | 213 (M$^+$) | |

Friedel-Crafts reaction of
N-acetyl-(S)-1-(α-naphthyl)ethylamine

In the same manner as in Example 1, 6.0 g of an optically active amide-carboxylic acid was prepared by using 5 g of N-acetyl-(S)-1-(α-naphthyl)ethylamine, 1.5 liters of dried methylene chloride, 2.58 g of succinic anhydride and 12.52 g of aluminum chloride. This compound also has positional isomers with respect to the aromatic ring, but the isomers are not required to be separated or purified for use. By the high performance liquid chromatography, it was confirmed that no starting material was present in the mixture, and the chemical structure was ascertained by the IR analysis whereby absorptions attributable to ketone and carboxylic acid were observed anew.

| | | |
|---|---|---|
| IR $\nu_{max}^{KCl}$: | 1720 cm$^{-1}$ | Ar—carobxylic acid |
| | 1690 cm$^{-1}$ | Ketone |
| | 1670 cm$^{-1}$ | Amide |
| | 1600 cm$^{-1}$ | Aromatic ring |

Condensation of the optically active amide-carboxylic acid to the α-aminopropyl grafted silica gel A packing material having an optically active stationary phase was prepared by conducting the same treatment as in Example 1.
Elemental analysis: C: 9.7%, H: 1.2%, N: 2.8%.

APPLICATION EXAMPLE 1

Each packing material of Examples 1 to 5 was packed into a column by a slurry method and used for the separation of a racemic sample under the following condition for measurement, whereupon the separation factor (α) and the number of theoretical plates (N) were determined. The results are shown in Table 2.

| | |
|---|---|
| Column: | Stainless steel column of 4.6 mm in diameter and 25 cm in length |
| Detector: | UV-8000 (manufactured by TOSOH CORPORATION) —254 nm |
| Pump: | CCPD (manufacture by TOSOH CORPORATION) |
| Temperature: | 25° C. |
| Flow rate: | 1 ml/min |
| Eluent: | n-hexane/1,2-dichloroethane/ethanol = 70/29/1 |

APPLICATION EXAMPLE 2

Through a stainless steel coulmn of 4.6 mm in diameter and 25 cm in length packed with the packing material obtained in Example 3, a 0.1N HCl-methanol solution was passed to remove the portion fixed by the ionic bond to the packing material, and then the separation of a racemic sample was conducted under the same condition as in Application Example 1. The results are shown in Table 3.

TABLE 3

| Packing material | Example 3 | | | | Acid treated Example 3 | | | |
|---|---|---|---|---|---|---|---|---|
| Sample | K'$_1$ | K'$_2$ | α | N | K'$_1$ | K'$_2$ | α | N |
| I | 7.75 | 9.93 | 1.21 | 2,700 | 5.72 | 6.94 | 1.21 | 5,500 |
| II | 3.47 | 5.03 | 1.45 | 4,300 | 2.13 | 2.87 | 1.35 | 11,100 |
| III | 4.71 | 6.75 | 1.43 | 2,600 | 3.07 | 4.09 | 1.33 | 12,200 |
| IV | 4.51 | 7.05 | 1.56 | 3,100 | 2.87 | 4.13 | 1.44 | 11,070 |

I: N—3,5-dinitrobenzoyl-dl-alanine methyl ester
II: N—3,5-dinitrobenzoyl-dl-valine methyl ester
III: N—3,5-dinitrobenzoyl-dl-n-valine methyl ester
IV: N—3,5-dinitrobenzoyl-dl-leucine methyl ester

APPLICATION EXAMPLE 3

In order to modify and protect the amino groups remaining on the surface of the carrier without being fixed by amide bonds by acetylation, 3.5 g of the packing material silica gel obtained in Example 1 was suspended in 20 ml of pyridine, then 2 ml of acetic anhydride was added thereto, and the mixture was reacted at 38° C. for 12 hours. After completion of the reaction, the reaction mixture was subjected to filtration by a glass filter, and the treated silica gel was washed with 50 ml of a 0.1N HCl-methanol solution, with 100 ml of a H$_2$O-methanol solution and with 200 ml of methanol and dried under reduced pressure. By using the packing material thus obtained, the separation of a racemic sample was conducted under the same condition as in Application Example 1. The results are shown in Table 4 together with the results obtained by the packing material of Example 1.

TABLE 4

| Packing material | Example 1 | | | | Acid treated Example 1 | | | |
|---|---|---|---|---|---|---|---|---|
| Sample | K'$_1$ | K'$_2$ | α | N | K'$_1$ | K'$_2$ | α | N |
| I | 2.87 | 4.05 | 1.41 | 13,000 | 2.47 | 3.19 | 1.29 | 23.400 |
| II | 3.97 | 5.48 | 1.38 | 13,700 | 3.47 | 4.47 | 1.29 | 17,300 |
| III | 3.84 | 5.79 | 1.50 | 11,400 | 3.39 | 4.65 | 1.37 | 16,700 |
| IV | 3.51 | 4.95 | 1.41 | 13,000 | 3.07 | 4.05 | 1.32 | 22,900 |

I: N—3,5-dinitrobenzoyl-dl-valine methyl ester
II: N—3,5-dinitrobenzoyl-dl-n-valine methyl ester
III: N—3,5-dinitrobenzoyl-dl-leucine methyl ester
IV: N—3,5-dinitrobenzoyl-dl-n-leucine methyl ester

TABLE 2

| | Example 1 | | Example 2 | | Example 3 | | Example 4 | | Example 5 | |
|---|---|---|---|---|---|---|---|---|---|---|
| Packing material | α | N | α | N | α | N | α | N | α | N |
| Sample I | 1.41 | 13,000 | 1.45 | 3,900 | 1.45 | 4,300 | 1.49 | 2,700 | 1.43 | 2,000 |
| Sample II | 1.50 | 11,400 | 1.57 | 3,200 | 1.56 | 3,100 | 1.54 | 2,800 | 1.54 | 1,200 |
| Sample III | 1.41 | 13,000 | 1.47 | 4,200 | 1.46 | 4,000 | 1.53 | 2,900 | 1.45 | 1,900 |
| Sample IV | 1.16 | 10,300 | 1.14 | 3,300 | 1.14 | 3,300 | 1.12 | 2,400 | 1.12 | 2,800 |
| Sample V | 1.27 | 9,800 | 1.30 | 3,050 | 1.32 | 3,000 | 1.32 | 2,200 | 1.29 | 2,000 |

Sample I: N—3,5-dinitrobenzoyl-dl-valine methyl ester
Sample II: N—3,5-dinitrobenzoyl-dl-leucine methyl ester
Sample III: N—3,5-dinitrobenzoyl-dl-n-leucine methyl ester
Sample IV: N—3,5-dinitrobenzoyl-dl-α-phenylglycine methyl ester
Sample V: N—3,5-dinitrobenzoyl-dl-α-phenyl ethylamine

APPLICATION EXAMPLE 4 AND COMPARATIVE EXAMPLE 1

As a packing material of the present invention, the packing material treated in Application Example 3 was employed. On the other hand, as a Comparative Example, a packing material prepared by suspending 4 g of silica gel carrier having carboxyl groups on its surface (average particle size: 4 μm, pore size: 100 Å, carboxyl group: 0.5 meq/g) in 40 ml of THF, adding 824 mg of DCC thereto, stirring the mixture at room temperature for 3 hours, then adding 684 mg of (S)-(−)-α-(1-naphthyl)ethylamine) thereto, reacting the mixture at 40° C. for two hours under stirring, subjecting the mixture to filtration by a glass filter, washing the treated silica gel with 400 ml of methanol and drying it under reduced pressure, was used for the separation of a racemic sample under the same condition as in Application Example 1. The results are shown in Table 5. It is evident that with the packing material of the Comparative Example, the separataion factor is 1.00 thus indicating that the separation was impossible, while with the packing material of the present invention, the separation was possible. Further, FIGS. 1 and 2 show the chromatograms in the cases where samples II and V were subjected to separation by means of the packing materials of the present invention.

TABLE 5

| Packing material | Acetylated Example 1 | | | Comparative Example 1 | | |
|---|---|---|---|---|---|---|
| Sample | $K'_1$ | $K'_2$ | α | $K'_1$ | $K'_2$ | α |
| I | 2.25 | 2.35 | 1.04 | 1.41 | 1.41 | 1.00 |
| II | 1.48 | 1.69 | 1.14 | 4.85 | 5.05 | 1.04 |
| III | 4.67 | 5.08 | 1.09 | 3.46 | 3.46 | 1.00 |
| IV | 2.77 | 3.13 | 1.13 | 2.94 | 2.94 | 1.00 |
| V | 2.77 | 3.13 | 1.13 | 1.00 | 1.00 | 1.00 |

I: N—3,5-dinitrobenzoyl-dl-proline methyl ester
II: N—3,5-dinitrobenzoyl-dl-sec-butyl amine
III: N—3,5-dinitrobenzoyl-dl-sec-heptyl amine
IV: N—3,5-dinitrobenzoyl-α-phenylethylamine
V: N—benzoyl-dl-α-phenylethylamine

APPLICATION EXAMPLES 5 and 6

By using the packing materials obtained in Examples 6 and 7, separation of a racemic sample was conducted under the same condition as in Application Example 1. The results are shown in Table 6.

TABLE 6

| Packing material | Example 6 | | | Example 7 | | |
|---|---|---|---|---|---|---|
| Sample | $K'_1$ | $K'_2$ | α | $K'_1$ | $K'_2$ | α |
| I | 5.23 | 6.15 | 1.18 | 11.35 | 13.93 | 1.23 |
| II | 2.65 | 3.31 | 1.29 | 4.24 | 5.03 | 1.19 |
| III | 3.45 | 4.12 | 1.31 | 7.53 | 10.35 | 1.37 |
| IV | 5.73 | 7.27 | 1.27 | 12.71 | 17.23 | 11.36 |

I: N—3,5-dinitrobenzoyl-dl-alanine methyl ester
II: N—3,5-dinitrobenzoyl-dl-valine methyl ester
III: N—3,5-dinitrobenzoyl-dl-n-valine methyl ester
IV: N—3,5-dinitrobenzoyl-dl-methionine methyl ester As described in the foregoing, the packing material of the present invention wherein an optically active compound is used as the stationary phase, has a merit in that by the selection of an optically active aromatic amine wherein the asymmetric center is not active methylene, the range of its application can be widened to samples which used to be hardly separable by the conventional method for the separation of a racemic modification sample by an optically active compound. Further, its preparation is quite simple. Thus, it is an excellent packing material.

We claim:

1. A packing material for liquid chromatography, which comprises an optically active compound having the formula:

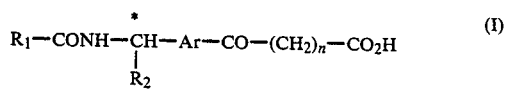

fixed on a carrier material, wherein Ar is a phenyl group, an α-naphthyl group or a β-naphthyl group, $R_1$ is an alkyl group having from 1 to 4 carbon atoms, a phenyl group or a 3,5-dinitrophenyl group, $R_2$ is an alkyl group having from 1 to 4 carbon atoms, * indicates an asymmetric carbon atom and n is an integer of 2 or 3, as a stationary phase.

2. The packing material according to claim 1, wherein $R_1$ is a methyl group, a phenyl group or a 3,5-dinitrophenyl group and $R_2$ is a methyl group.

3. The packing material according to claim 1, wherein the compound of the formula I is fixed on a porous carrier.

4. The packing material according to claim 1, wherein the compound of the formula I is fixed in an amount of from 0.1 to 1.0 meq/g dry carrier.

5. The packing material according to claim 3, wherein the compound of the formula I is fixed to the carrier by an amide bond or an ionic bond.

6. The packing material according to claim 3, wherein the porous carrier is spherical particles having a particle size of from 0.1 to 100 μm and a pore size of from 10 to 1,000 Å.

7. The packing material according to claim 3, wherein the porous carrier is silica gel, glass beads or diatomaceous earth.

* * * * *